United States Patent
Einboeck et al.

(10) Patent No.: US 7,617,904 B1
(45) Date of Patent: Nov. 17, 2009

(54) TRANSMISSION FOR VEHICLE

(75) Inventors: Fritz Einboeck, Gunskirchen (AT); Roland Ennsmann, Wels (AT)

(73) Assignee: BRP-Powertrain GmbH & Co KG, Gunskirchen (AT)

( * ) Notice: Subject to any disclaimer, the term of this patent is extended or adjusted under 35 U.S.C. 154(b) by 388 days.

(21) Appl. No.: 11/608,450

(22) Filed: Dec. 8, 2006

Related U.S. Application Data

(60) Provisional application No. 60/746,113, filed on May 1, 2006.

(51) Int. Cl.
  *B60K 23/00* (2006.01)
(52) U.S. Cl. .................. 180/336; 180/908; 180/337; 74/473.21
(58) Field of Classification Search ............. 74/473.21, 74/473.24, 473.26, 473.37; 180/336, 908, 180/315, 337
  See application file for complete search history.

(56) References Cited

U.S. PATENT DOCUMENTS

| | | | |
|---|---|---|---|
| 2,637,592 A * | 5/1953 | Karlby | ................. 296/193.01 |
| 4,093,264 A | 6/1978 | Ishihara et al. | |
| 4,510,820 A | 4/1985 | Tsuboi | |
| 5,411,448 A | 5/1995 | Horii et al. | |
| 6,619,450 B2 | 9/2003 | Ota et al. | |
| 7,055,383 B2 | 6/2006 | Kawakubo et al. | |
| 7,137,311 B1 * | 11/2006 | Neubauer et al. | ............. 74/335 |

FOREIGN PATENT DOCUMENTS

| | | |
|---|---|---|
| GR | 1003851 | 3/2002 |
| JP | 60034555 | 2/1985 |
| JP | 62020934 | 1/1987 |
| JP | 62215151 | 9/1987 |
| JP | 62234728 | 10/1987 |
| JP | 1078996 | 3/1989 |
| JP | 08026175 | 1/1996 |
| JP | 10159973 | 6/1998 |
| JP | 10230894 | 9/1998 |
| JP | 11013882 | 1/1999 |
| JP | 2003148612 | 5/2003 |
| JP | 2003148614 | 5/2003 |
| JP | 2005030549 | 2/2005 |

OTHER PUBLICATIONS

English Abstract of Japanese Application No. 62020934.
English Abstract of Japanese Application No. 62215151.
English Abstract of Japanese Application No. 62234728.
English Abstract of Japanese Application No. 2003148612.
English Abstract of Japanese Application No. 2003148614.
English Abstract of Japanese Application No. 2005030549.
English Abstract of Japanese Application No. 08026175.
English Abstract of Japanese Application No. 10159973.
English Abstract of Japanese Application No. 10230894.
English Abstract of Japanese Application No. 11013882.
English Abstract of Japanese Application No. 60034555.
English Abstract of Greek Application No. 1003851.
English Abstract of Japanese Application No. 1078996.

* cited by examiner

*Primary Examiner*—Ruth Ilan
*Assistant Examiner*—Keith Frisby
(74) *Attorney, Agent, or Firm*—Osler, Hoskin & Harcourt LLP

(57) ABSTRACT

A transmission assembly for a vehicle, the transmission assembly having an energy storing mechanism linking its gear selector to the gear shifting mechanism and adapted to limit the force applied to the gear shifting mechanism through the gear selector.

20 Claims, 13 Drawing Sheets

TRANSMISSION FOR VEHICLE

CROSS REFERENCES TO RELATED APPLICATIONS

The present Utility Patent Application claims priority from U.S. Provisional Patent Application No. 60/746,113 filed May 1, 2006, the content of which is incorporated herein by reference. The present Utility Patent Application is also related to U.S. Application Publication No. 2003/0221893 A1 published Dec. 4, 2003, the content of which is incorporated herein by reference.

FIELD OF THE INVENTION

The present invention relates to transmission for vehicles, and to transmission gear selection mechanisms in particular.

BACKGROUND OF THE INVENTION

Taking All-Terrain Vehicle (ATV) as an example, a typical ATV includes front wheels and rear wheels suspended on a front end and on a rear end, respectively, of a body frame. Handlebars and a seat are mounted on the frame. A power unit such as an engine is also mounted on the frame and generates the power required to propel the ATV. A transmission is provided to transfer the power generated by the engine to the front wheels, the rear wheels or both the front and rear wheels to drive the vehicle. Typically, the ATV operator selects the required gear ratio by actuating a gear selection lever extending outside the transmission, which is mechanically linked to the gear shifting mechanism inside the transmission. If for any reason the gears are locked together or difficult to engage or disengage, the force exerted by the ATV operator on the gear selection lever may be excessive and either damage internal components of the transmission or damage the gear selection lever itself.

Some switching gear devices have been designed in two parts with a spring connecting the first part to the second part thereby providing some buffer between the actuating force of the operator and the force applied to internal components of the transmission to effect gear changes. However, these switching gear devices protrude from the transmission and are exposed to the environment and may therefore be subject to relatively rapid deterioration.

Thus, there is a need for an improved gear selection mechanism ameliorating some of the difficulties with the prior art.

STATEMENT OF THE INVENTION

One aspect of the present invention is to provide a transmission assembly having an energy storing device disposed within the transmission housing.

Another aspect of the present invention is to provide a transmission assembly comprising a housing; a gear selector disposed outside the transmission housing; an input shaft and an output shaft, both shafts being at least partially inside the housing; a plurality of gears mounted on the input shaft and a plurality of gears mounted on the output shaft, each of the plurality of gears being disposed within the housing; a gearshift disposed within the housing and operatively connected to at least one of the plurality of gears mounted on the input shaft and to at least one of the plurality of gears mounted on the output shaft for effecting gear changes; and an energy storing mechanism including a deformable elastic element for storing energy through its deformation, the energy storing mechanism being disposed within the transmission housing and linking the gear selector to the gearshift and limiting a force applied to the gearshift through the gear selector.

Preferably, the energy storing mechanism includes an elastic component selected from the group consisting of metal springs, elastomer elements and rubber elements.

In an additional aspect the energy storing mechanism includes a first element connected to the gear selector and a second element connected to the gear shifting mechanism, the elastic component connecting the first element to the second element.

For the purpose of the present application, the terms 'energy storing mechanism' mean an element or combination of elements adapted to absorb energy and release the energy absorbed.

For the purpose of the present application, the term 'elastic' means which is capable of being deformed and returning generally to its former shape.

Another aspect of the present invention is to provide an all-terrain vehicle comprising a frame supporting front and rear wheels; a straddle seat supported above the frame; a steering device member forward of the straddle seat; an engine having an output shaft, the engine being supported by the frame; and a transmission assembly as defined above operatively interconnected between the output shaft of the engine and at least one of the wheels.

Another aspect of the present invention is to provide a transmission assembly comprising: a housing; a gear selector disposed outside the transmission housing; an input shaft and an output shaft, both shafts being at least partially inside the housing; a plurality of gears mounted on the input shaft and a plurality of gears mounted on the output shaft, each of the plurality of gears being disposed within the housing; a gear shifting mechanism disposed within the housing and operatively connected to at least one of the plurality of gears and to the gear selector for effecting gear changes; and an energy storing mechanism linking the gear selector to the gear shifting mechanism and limiting a force applied to the gear shifting mechanism through the gear selector, the energy storing mechanism being disposed within the transmission housing.

Advantageously the energy storing mechanism is disposed parallel to the gear shifting mechanism.

Embodiments of the present invention each have at least one of the above-mentioned aspects, but do not necessarily have all of them.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DESCRIPTION OF PREFERRED EMBODIMENT(S)

Figure 1:
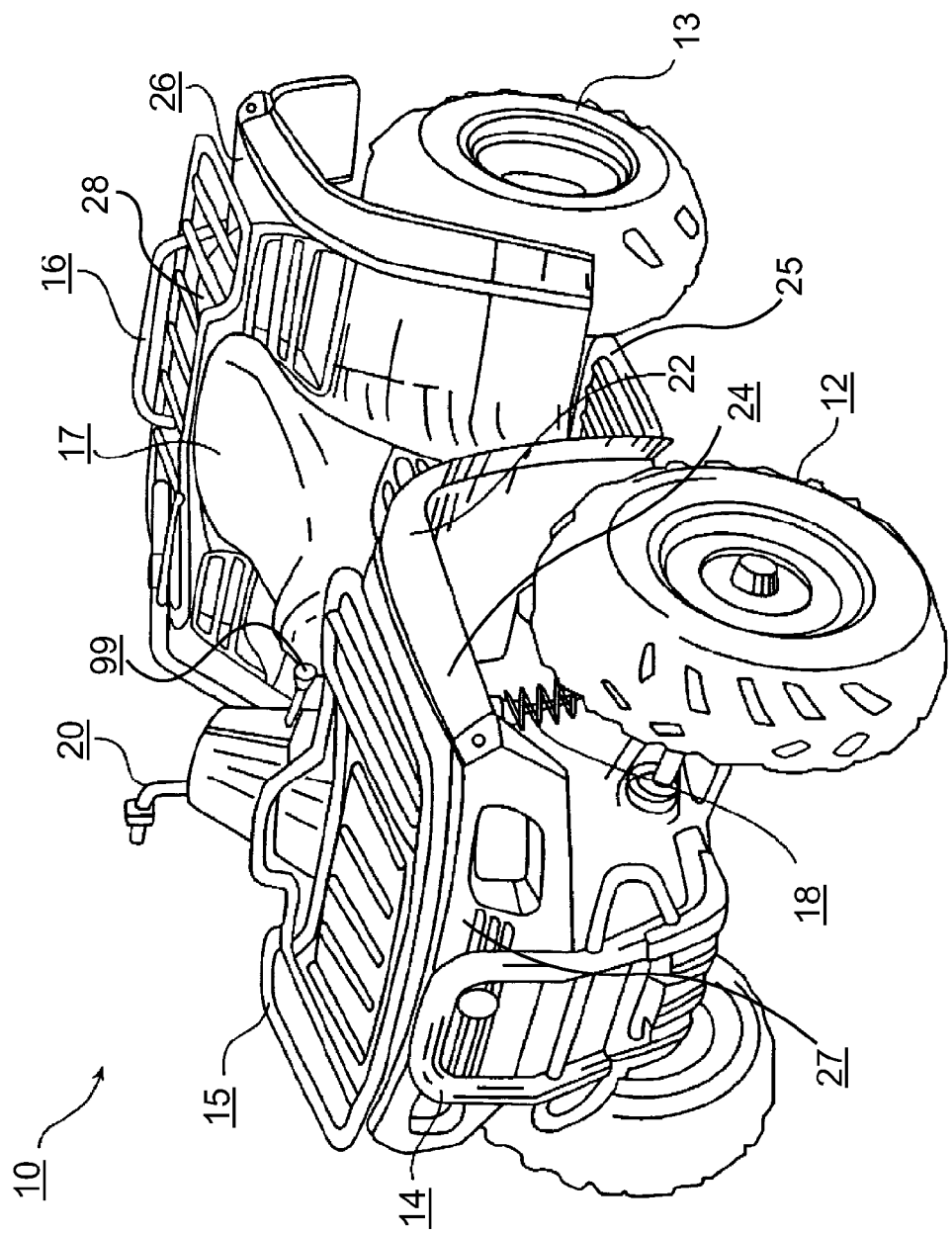
FIG. 1 is a perspective view of an all-terrain vehicle in accordance with an embodiment of the invention.

FIG. 1 illustrates an ATV 10 in accordance with one specific embodiment of the invention. The vehicle 10 has a pair of front wheel assemblies 12 and a pair of rear wheel assemblies 13. The vehicle 10 includes a straddle seat 17 positioned over the engine/transmission assembly 34 (FIG. 2) and a steering system which includes a steering member in the form of handlebars 20 to transfer steering commands of the rider to the front wheel assemblies 12. The vehicle 10 also features a front bumper 14, a front carriage rack 15 and a rear carriage rack 16 disposed over the bodywork 22. The bodywork 22 includes front and rear fenders 24 and 26 respectively, footrests 25 on either side of the vehicle 10 and joining the front end rear fenders 24 and 26, and fairing elements 27 and 28 covering the front and rear portion of the vehicle 10 respectively.

Figure 2:
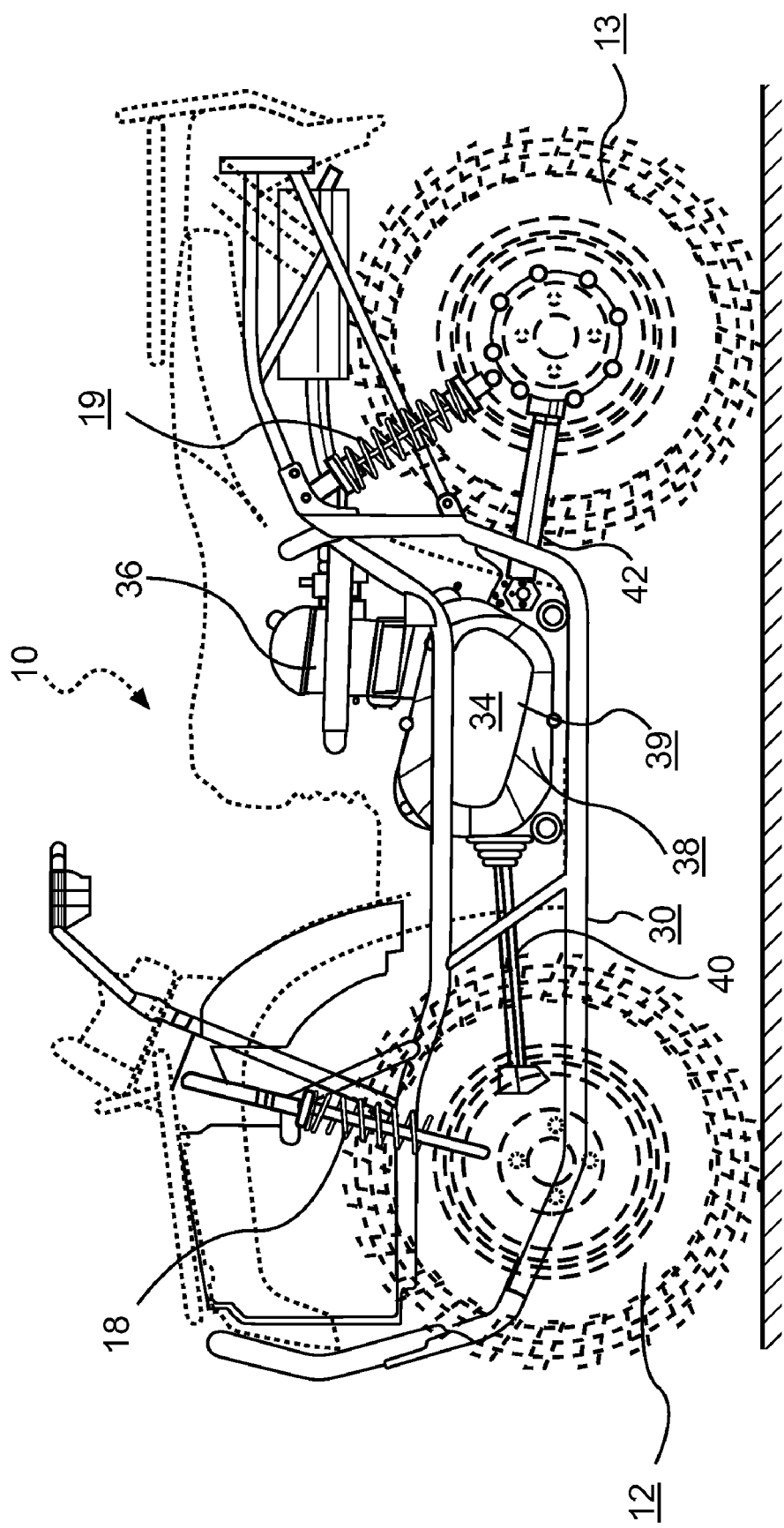
FIG. 2 is a side elevational view of the all-terrain vehicle illustrated in FIG. 1 with the outer shell of the vehicle shown in dotted lines.

As illustrated in FIG. 2, the ATV 10 includes a frame 30 that supports and houses the engine/transmission assembly 34 positioned between the front wheels assemblies 12 and the rear wheel assemblies 13. The front wheel assemblies 12 are connected to the front portion of frame 30 via a front suspension system including shock absorber/coil spring assemblies 18 disposed on both sides of frame 30. The rear wheel assemblies 13 are connected to the rear portion of frame 30 via a rear suspension system including shock absorber/coil spring assemblies 19. The engine/transmission assembly 34 includes an engine 36 directly connected to a transmission 38. The transmission housing may be integrated, or partially integrated with the casing of engine 36. The transmission 38 includes two sub-transmissions; a continuously variable transmission (CVT) 41, and a geared sub-transmission 43, the moving components of which are enclosed within a transmission casing or housing 39. The CVT 41 is operatively connected to the geared sub-transmission 43 to transmit engine torque. The engine torque is transmitted from the geared sub-transmission 43 to the front and rear wheels assemblies 12 and 13 via the driving shafts 40 and 42 and provide motive power to the ATV 10. While the ATV 10 illustrated is all-wheel drive, the ATV 10 may be of a front wheel or rear wheel drive variety.

Figure 3:
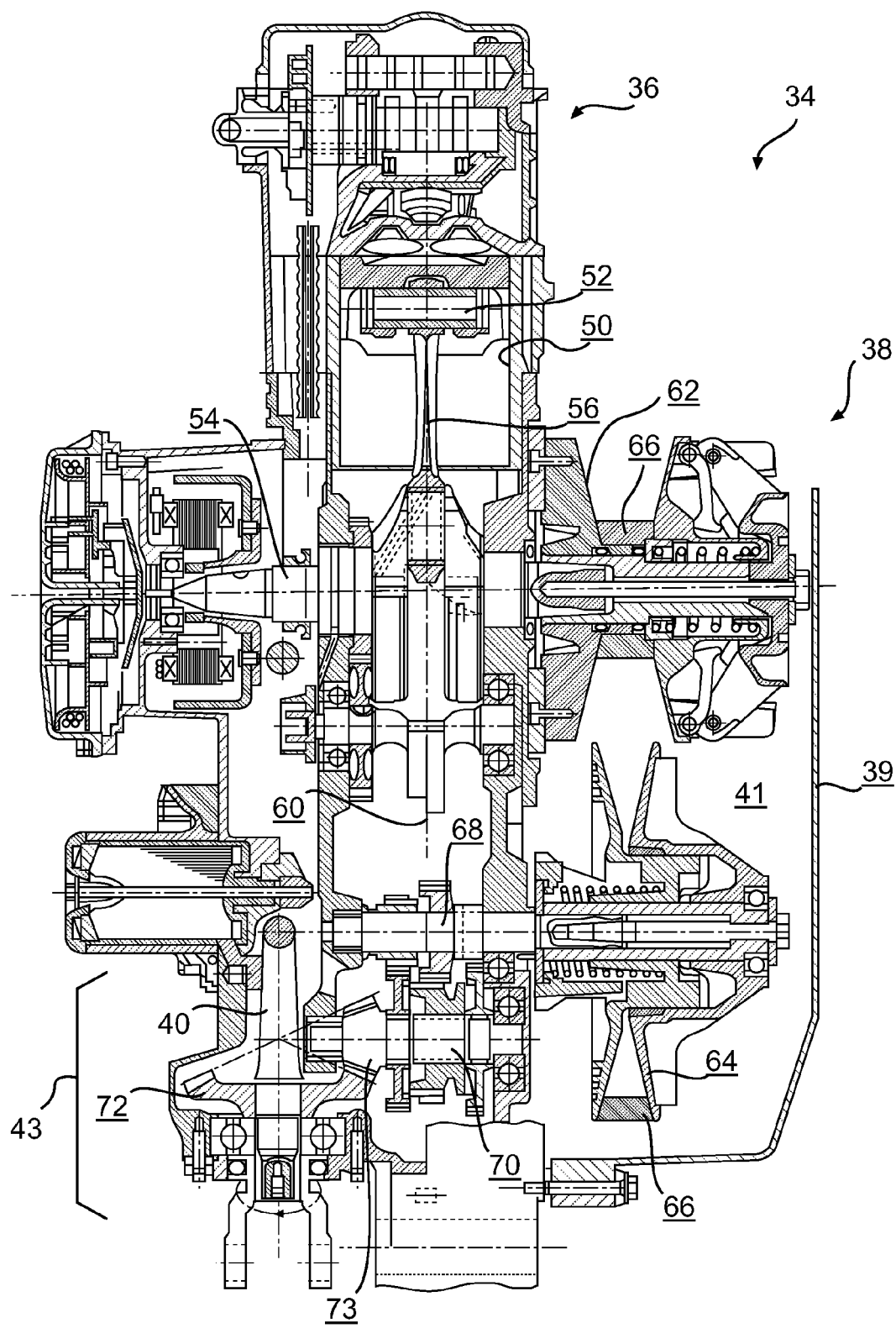
FIG. 3 is a cross-sectional view of an embodiment of an engine/transmission assembly suitable for use with the all-terrain vehicle illustrated in FIGS. 1 and 2.

FIG. 3 illustrates the engine/transmission assembly 34 in which the engine 36 is a single cylinder, internal combustion engine associated with a continuously variable transmission (CVT) 41. However, the engine/transmission assembly 34 should not be limited to a single cylinder. Instead, the features of the present invention may be applied to any type of internal combustion engine, as would be appreciated by those skilled in the art. For example, the features of the present invention may be applied to a multiple cylinder, in-line, V-type, or opposed cylinder engine without deviating from the scope of the present invention. Furthermore, while the present invention includes a CVT for use with a single cylinder engine, those skilled in the art would readily appreciate that the CVT could be easily used with any other type, style, or size of internal combustion engine. Moreover, while a CVT is preferred for use with the engine of the present invention, it would be readily appreciated by those skilled in the art that the standard clutch system could be substituted for the CVT without deviating from the scope of the present invention. In addition, while the engine/transmission assembly 34 has been specifically designed for use with an ATV, which is the preferred use for the present invention, the present invention is not limited to use on ATVs. The present invention may be used in any other suitable vehicle type, including scooters, motorcycles, karts, and other suitable vehicles.

As shown in FIG. 3, the engine 36 includes a cylinder 50, a piston 52 slidably mounted within the cylinder 50, a crankshaft 54, and a connecting rod 56 interconnecting the piston 52 and the crankshaft 54. In the illustrated embodiment, the crankshaft 54 is mounted transversely to the centerline 60 of the engine 36. The engine 36 may be provided within any suitable fuel delivery system without departing from the scope of the present invention (e,g. carburetor or fuel injection system). include the output shaft 70 supported by a casing bearing 74, the output shaft 70 having a shift gear 75 and two idle gears 76 and 77 mounted on the output shaft 70 on opposing sides of the shift gear 75; an input shaft 68 having one shift gear 78 and a idle gear 79 (FIG. 5) mounted thereon. As is well known in the field of automotive transmissions, shift hubs having no circumferential teeth may be used instead of the shift gears 75 and 78 as gear engaging elements for engaging the sides of the idle gears to effect gear changes. As illustrated, a pair of shift forks 82 and 84 are operatively connected to the shift gears 75 and 78 respectively. The shift forks 82 and 84 are slidably mounted onto a fork rod 80 supported by the transmission casing. A shift drum 86 including a pair of grooves 88 and 90 operatively connected to shift forks 82 and 84 via followers 110, 111 that are received within a corresponding grooves 88 and 90 of the shift drum 86. A shifting assembly 91 has a shifting shaft 92 extending outwardly from the transmission casing so that it can be operatively engaged at a splined end 95 with a gear selector 99 in the form of a handle or a foot peg that can be actuated by an ATV operator to shift gears. In this embodiment, the gearshift or gear shifting mechanism 175 includes the shift drum 86 and the shift fork assembly. The shifting assembly 91 is operatively connected to the gearshift 175 to transfer shifting commands from the operator to the gears themselves and effect gear changes. The shifting assembly 91 includes the shifting shaft 92 having a segment gear 93 rotatably supported at one end thereof. The teeth of the segment gear 93 are operatively engaged with the teeth of the toothed wheel gear 94 of the shift drum 86. As illustrated, the shifting assembly 91 is disposed parallel to the shifting drum 86 thereby minimizing the axial length of the shift drum compared to a shifting assembly disposed directly at the end of the shift drum. The segment gear 93 performs the function of actuating the shift drum 86 to impart rotation of the shift drum 86 in one direction or the other. Instead of a segment gear, other actuators could be operatively connected to the shift drum 86, such as bi-directional pawls engaging the toothed wheel gear 94 or a hub on the shift drum 86. In a specific embodiment, a shift gate such as that disclosed in US Pat. Application Publication No. 2004/0002399 A1 (which is incorporated herein by reference) may be used instead of a shift drum to transfer the shifting commands from the operator to the gears themselves and effect gear changes.

Figure 4:
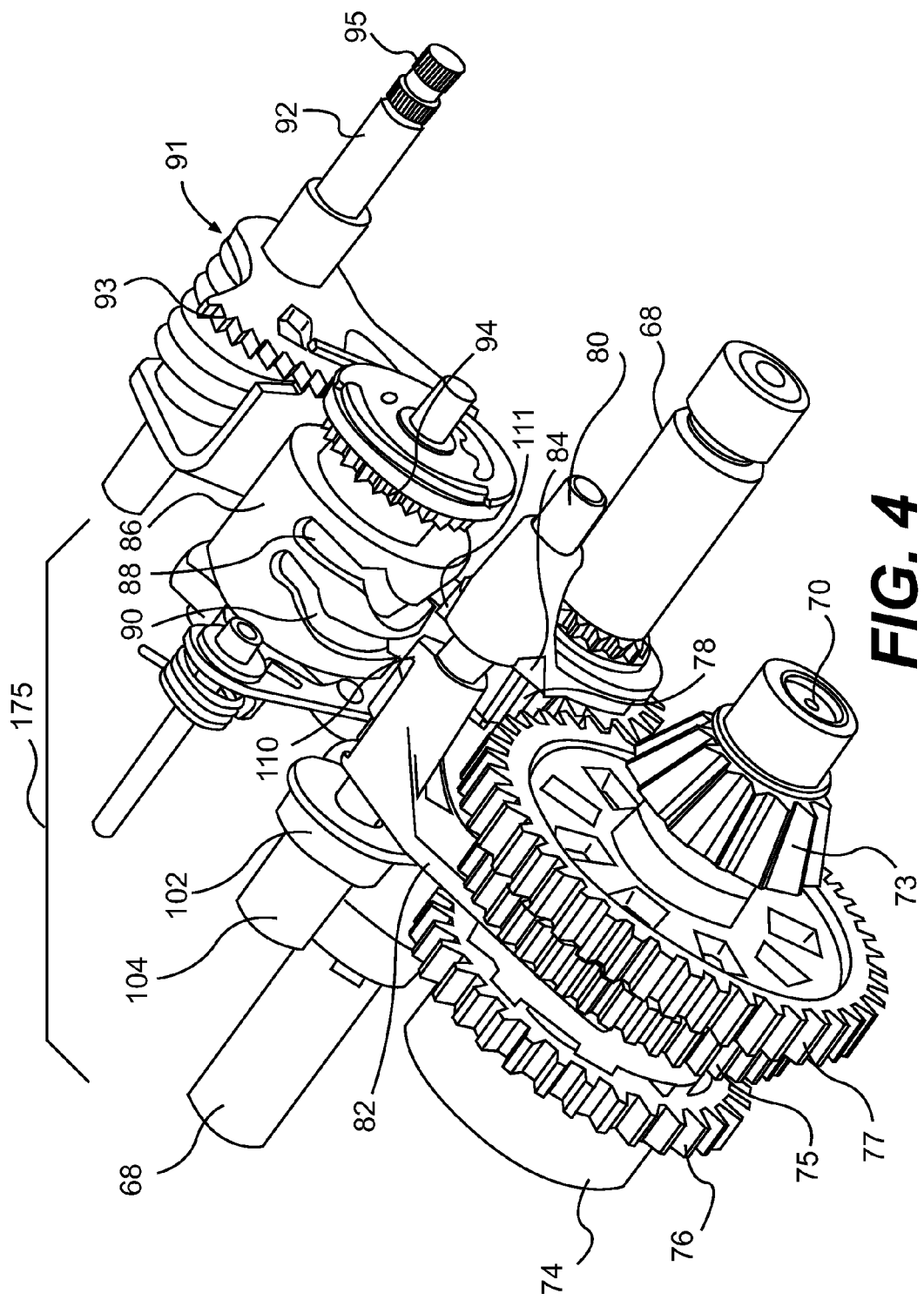
FIG. 4 is a perspective view of selected internal components of the embodiment of the transmission illustrated in FIG. 3.
Figure 5:
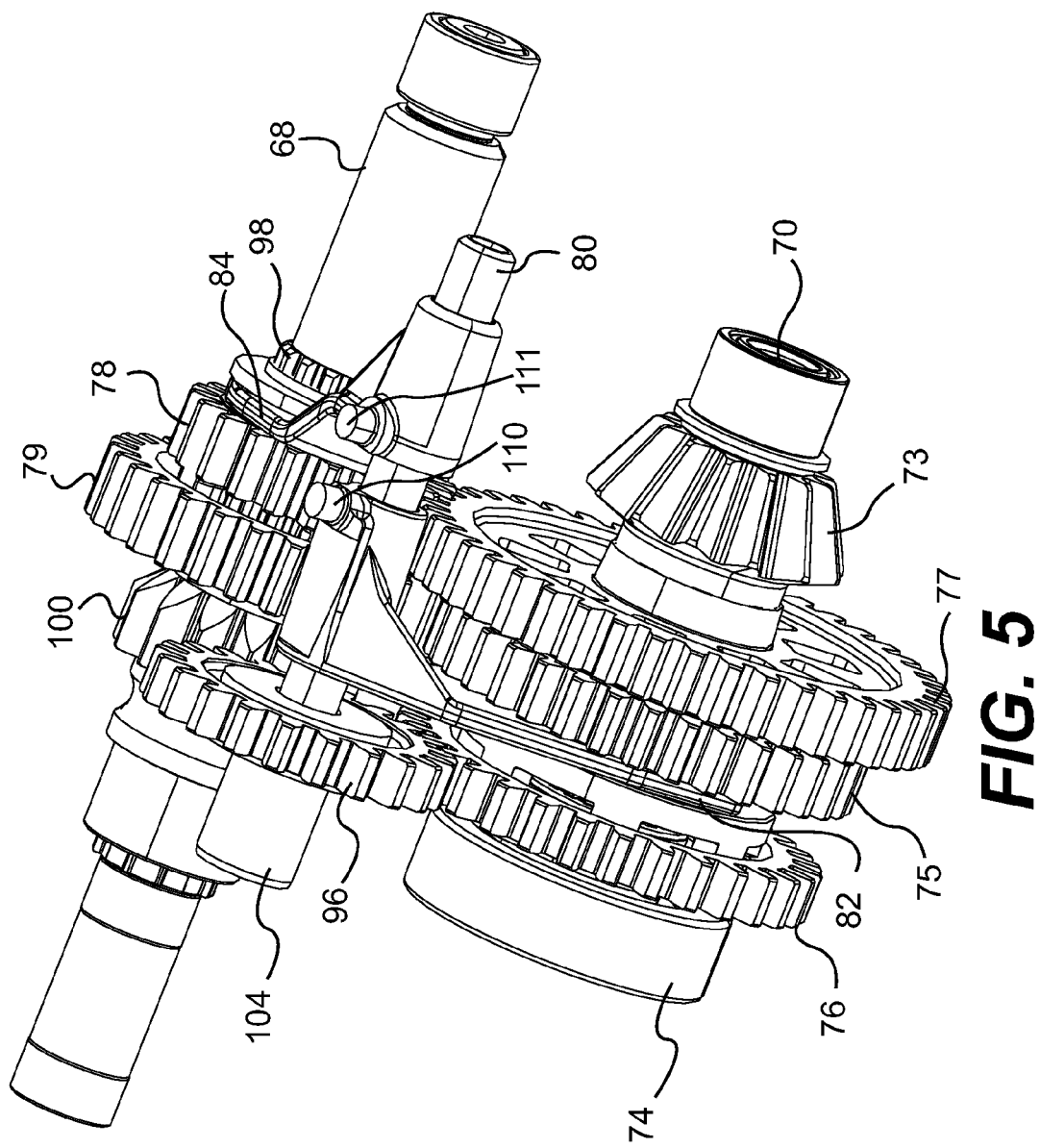
FIG. 5 is a second perspective view of selected internal components of the transmission illustrated in FIG. 4.
Figure 6A:
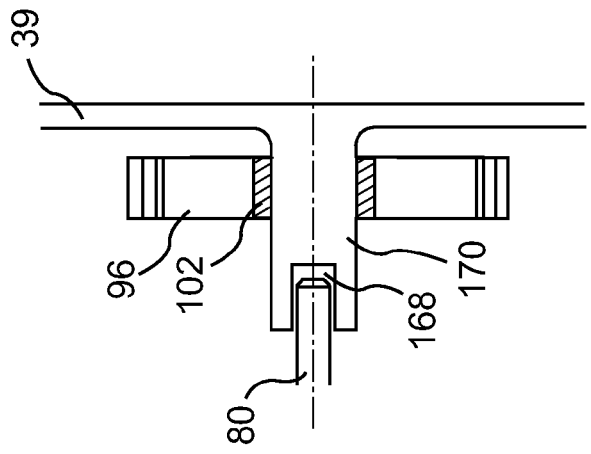
FIG. 6A is a schematic partial cross-sectional view of selected internal components of the transmission in accordance with another embodiment of the invention.
Figure 6:
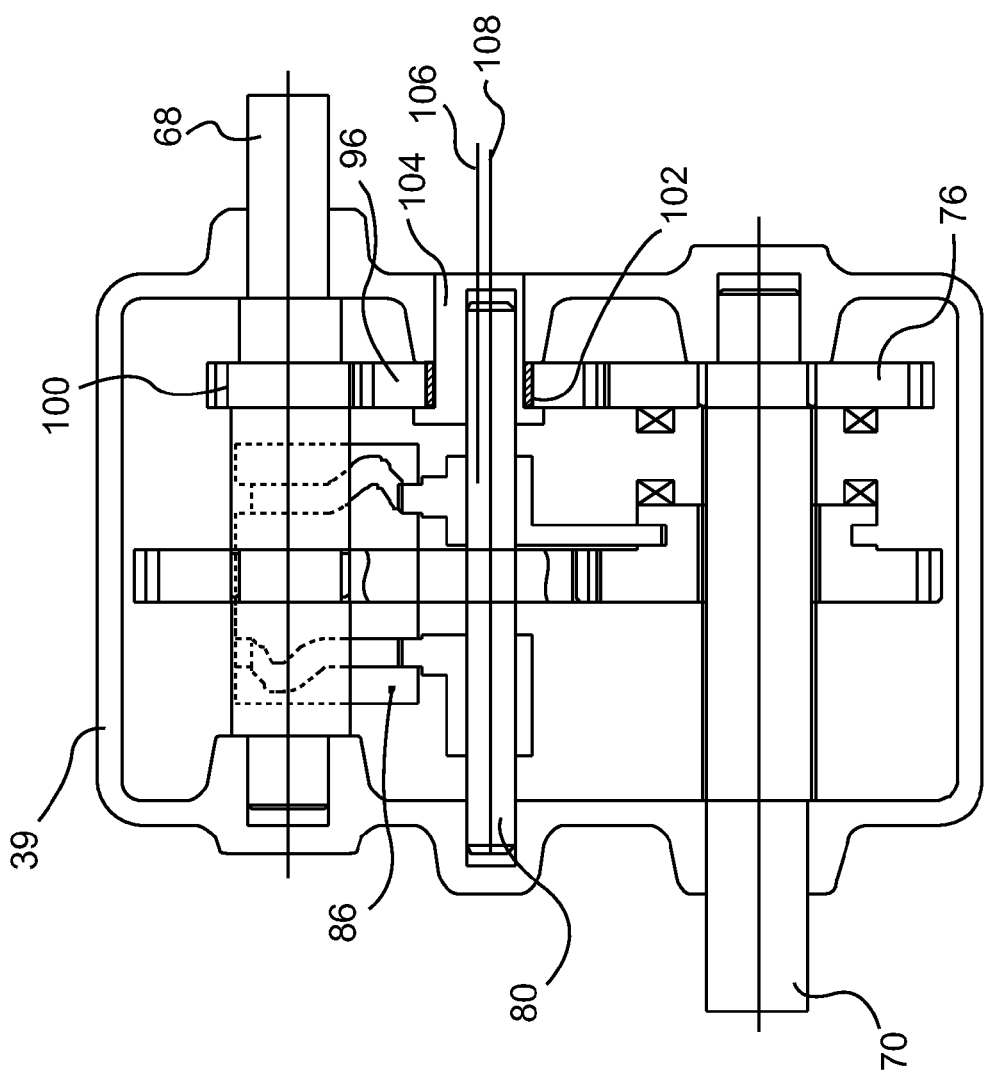
FIG. 6 is a schematic cross-sectional view of selected internal components of the transmission in accordance with an embodiment of the invention.

FIG. 5 illustrates the input shaft, the output shaft, the shift forks 82 and 84, and an auxiliary gear 96 in isolation from other internal components of the transmission 38. In a specific embodiment, the auxiliary gear 96 is used as the reverse gear. The auxiliary gear 96 may also serve to drive auxiliary components such as an auxiliary power take off shaft, a pump, etc. The auxiliary gear 96 is mounted on a bearing 102 (FIG. 4) provided on the outer portion of the supporting bushing 104 of the fork rod 80 such that the auxiliary gear 96 can rotate freely relative to the supporting bushing 104 or the fork rod 80. Depending on the design of the supporting bearing 104, the axis of rotation of the auxiliary gear 96 may coincide with the center line of the fork rod 80 or not. As illustrated in FIG. 6, the inner cavity of the supporting bearing 104 is offset relative to the axis of rotation 106 of the auxiliary gear 96 such that the center line 108 of the fork rod 80 does not coincide with the axis of rotation 106 of the auxiliary gear 96. The flexibility of design of the supporting bearing 104 provides more freedom of design for the positioning and various parameters of the auxiliary gear 96 (diameter, pitch, number of teeth, etc.) as well as adjacent gears 76 and 100. Supporting the auxiliary or reverse gear 96 on a bearing 102 which is located on the outer portion of the supporting bushing 104 of the fork rod 80 eliminates the need for a specific supporting shaft for the reverse gear as is typically used in gearboxes. As illustrated in FIG. 6A, the fork rod 80 may be supported directly on the inner cavity 168 of a protrusion 170 of the housing 39 whereas the bearing 102 of the auxiliary or reverse gear 96 is supported on the outer portion of the protrusion 170. Similarly, the axis of rotation of the auxiliary gear 96 may or may not coincide with the center line of the fork rod 80. Thus, a gearbox having a reverse or auxiliary gear 96 positioned in the vicinity of the center line 108 of the fork rod 80 yet not necessarily coaxial with the center line 108 may be lighter and more compact than typical gearboxes. In the specific embodiment illustrated in FIG. 5, the auxiliary/reverse gear 96 is coaxial with the center line 108 of the fork rod 80 and is positioned between the gear 100 of the input shaft 68 and idle gear 76 of output shaft 70.

With reference to FIG. 5, the shift gear 78 is operatively coupled to the input shaft 68 for common rotation through splines 98 on the inner surface of the shift gear 78 and the outer surface of the input shaft 68. The splines 98 prevent relative rotational movement between the shift gear 78 and the input shaft 68 while permitting relative axial movement therebetween. The fork 84 is engaged within a recess of the shift gear 78 and is thus adapted to selectively move the shift gear 78 along the input shaft 68 between a first position engaging the idle gear 79 and a second position disengaged from the idle gear 79. The idle gear 79 is mounted on the input shaft 68 adjacent the shift gear 88 using a bearing (not shown) such that the idle gear 79 can rotate relative to the input shaft 68. The input shaft 68 also includes a gear 100 that is machined directly thereon. This gear 100 may also be pres-fitted onto the input shaft 68 or simply fixed to the input shaft 68 so that it rotates in unison with the input shaft 68.

The output shaft 70 also includes a shift gear 75 operatively coupled to the output shaft 70 for common rotation about the output shaft axis through axially aligned splines on the inner surface of the shift gear 75 and the outer surface of the output shaft 70 (not shown). The splines prevent relative rotational movement between the shift gear 75 and the output shaft 70 while permitting relative axial movement therebetween. The fork 82 is engaged within a recess of the shift gear 75 and is thus adapted to selectively move the shift gear 75 between a first position engaging the idle gear 77, a second position engaging the idle gear 76, and a third position wherein the shift gear 75 is engaging neither of the idle gears 76 and 77. The idle gears 76 and 77 are mounted on the output shaft 70 on opposing sides of the shift gear 75 using bearings (not shown) such that the idle gears 76 and 77 can rotate relative to the output shaft 70. The output shaft 70 includes a bevel gear 73 that is drivingly interconnected with the gear 72 provided on the output shaft 40 as illustrated in FIG. 3.

In operation, the shift gears 75 and 78 of the input shaft 68 and of the output shaft 70 are controlled by shift forks 82 and 84 to change the gear ratio of the transmission. Specifically, the shift fork 82 is operatively engaged with the shift gear 75 on the output shaft 70 and its follower 110 is engaged within the corresponding groove 90 provided of the shift drum 86. The shift fork 84 is engaged with the shift gear 78 on the input shaft 68 and its follower 111 is engaged within the corresponding groove 88 provided of the shift drum 86. Thus, a rotation of the segment gear 93 of the shifting assembly 91 imparts a rotational movements of the shift drum 86. The grooves 88 and 90 impart lateral motion to the shift forks 82 and 84 which in turn move the shift gears 75 and 78 along their respective shaft according to a pre-determined sequence defined by the pattern of the grooves 88 and 90. In this specific embodiment, the shift drum 86 includes five positions: park, reverse, neutral, high, and low. Obviously, the shift drum 86 may provide for more or less positions depending on the number of gears and the specific requirements of the vehicle.

Figure 7:
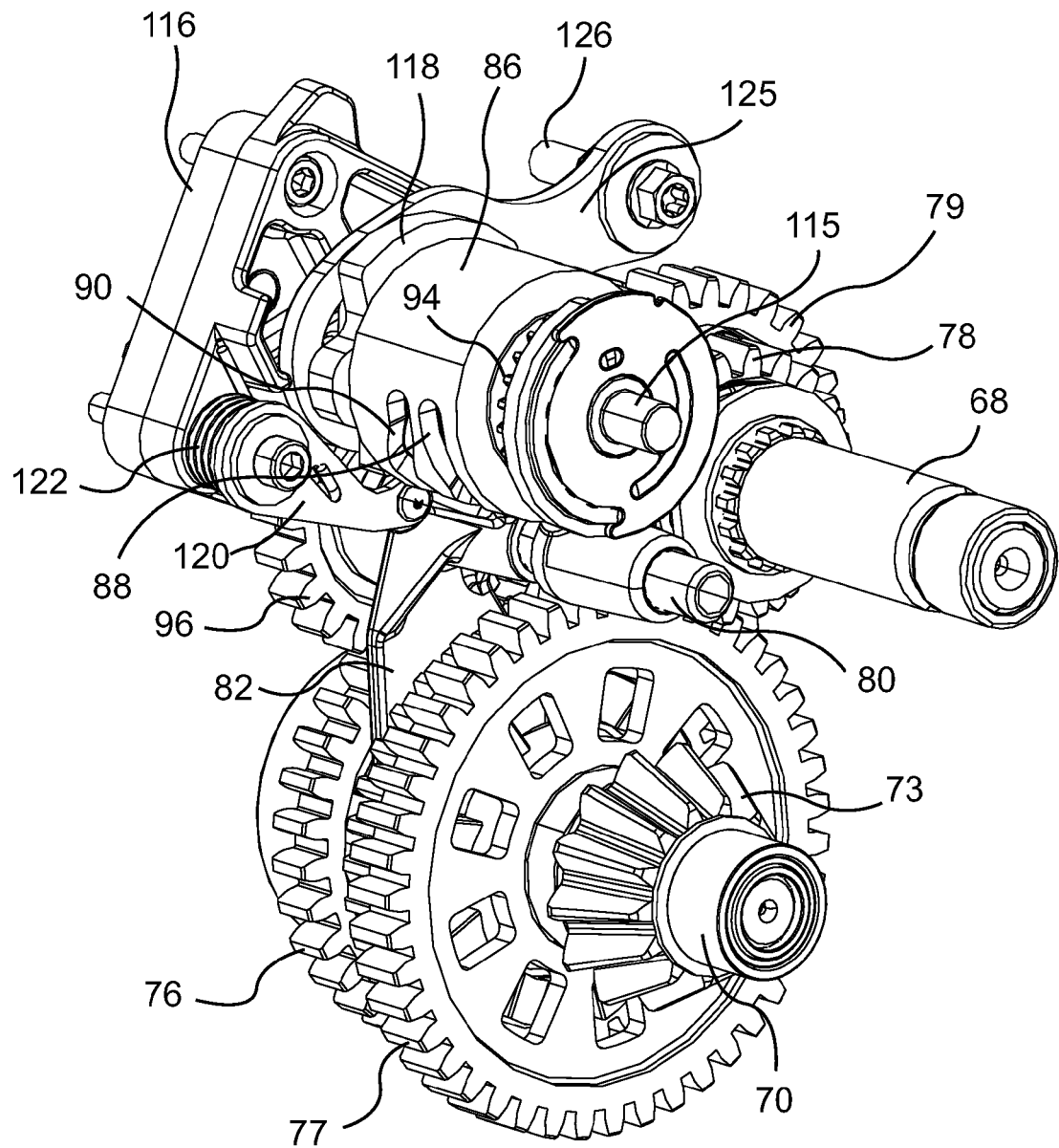
FIG. 7 is a another perspective view of selected internal components of the transmission illustrated in FIG. 4.

As illustrated in FIG. 7, the shift drum 86 is supported on one side by a first shaft portion 115 extending into a bearing within a cavity of the transmission casing (not shown) and on the other side by a second support shaft portion 113 (FIG. 8) extending into a bearing within a bearing shield 116 mounted on the transmission casing. A selector wheel 118 is connected to the shift drum 86 such that the gear positions are specifically defined. The selector wheel 118 is fixed to the shift drum 86 and follows the shift drum 86 through its rotation. An indexing lever 120 is pivotally mounted onto the bearing shield 116 and biased into engagement with the selector wheel 118 by a spring 122. The indexing lever 120 interacts with the selector wheel 118 to enable identification of the five possible positions. The selector wheel 118 has five recesses around the periphery thereof corresponding to the five positions of the shift drum 86. The indexing lever 120 engages within a selected one of the recesses, as the shift drum 86 is rotated via its toothed wheel gear 94 to mark one of the five positions. A park locking lever 125 is rotatably mounted to the transmission casing through a supporting shaft 126 extending into a bearing within a cavity of the transmission casing (not shown).

Figure 8:
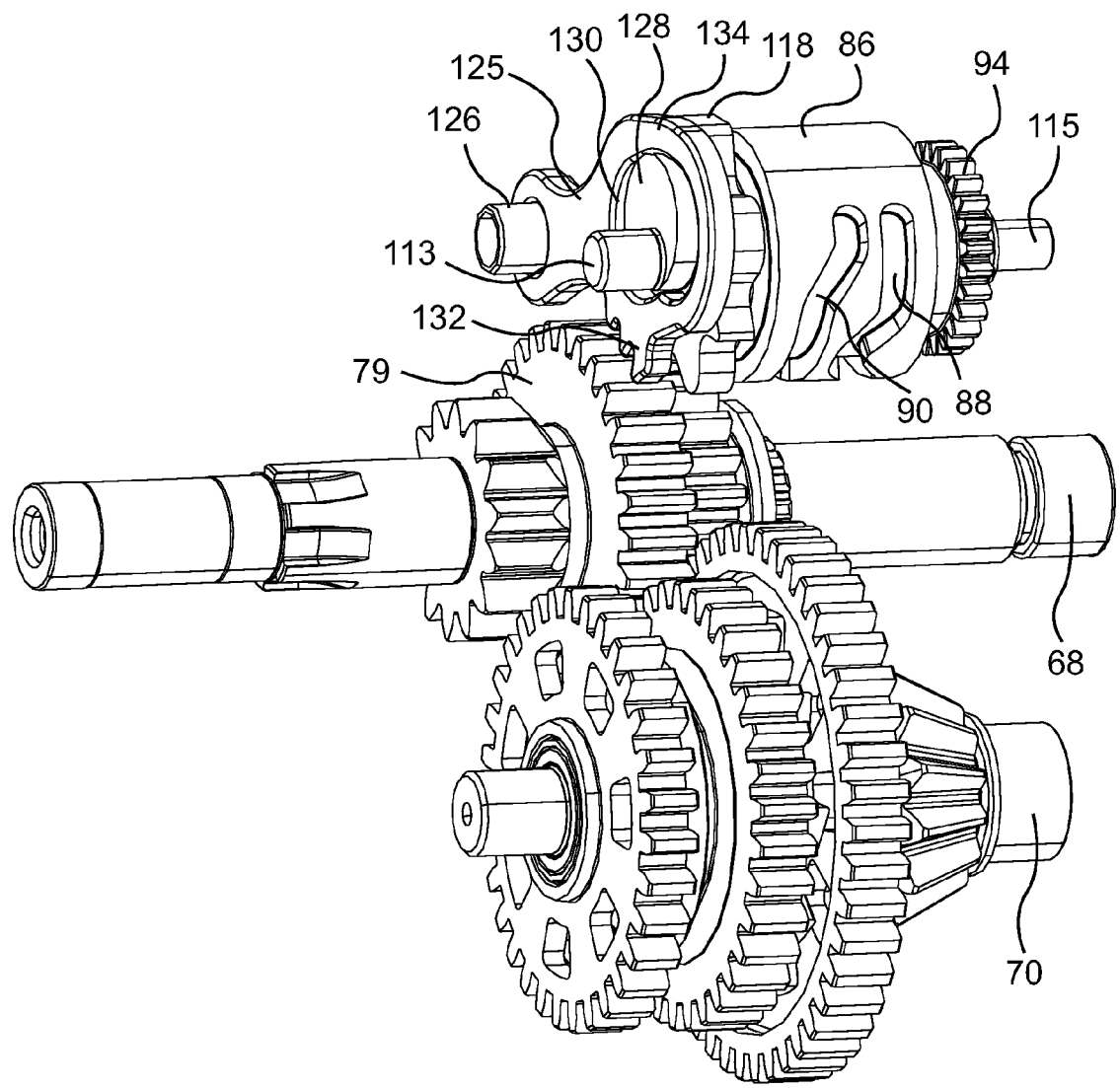
FIG. 8 is a another perspective view of selected internal components of the transmission illustrated in FIG. 4.
Figure 9:
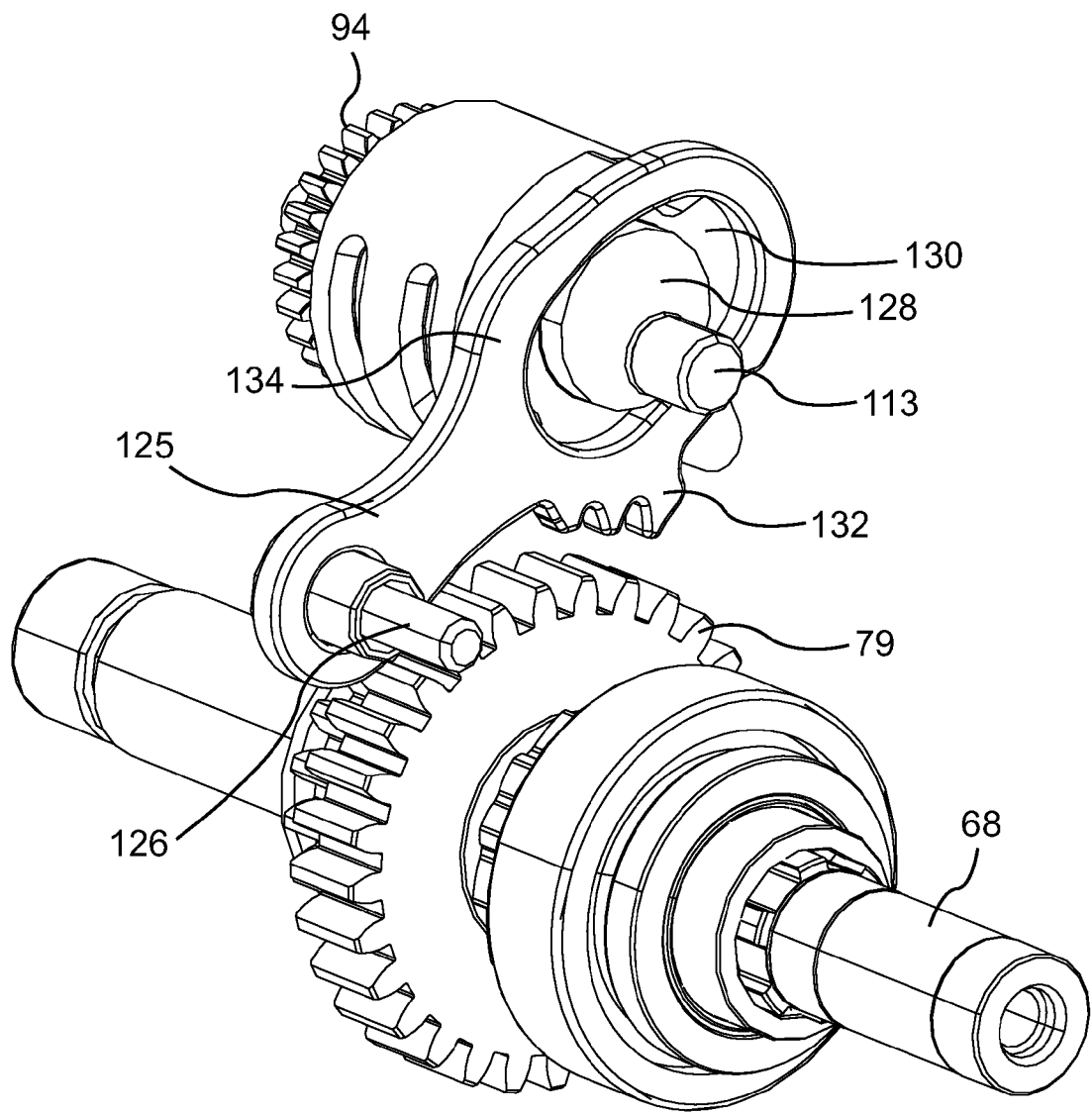
FIG. 9 is a further perspective view of selected internal components of the transmission illustrated in FIG. 4.

FIG. 8 is a perspective view from the opposite side of FIG. 7 with the bearing shield 116 and the indexing lever 120 removed to better show the park locking lever 125 operatively connected to the shift drum 86. As shown, the shift drum 86 includes a second support shaft portion 113 extending into a bearing within the bearing shield 116 (FIG. 7) which is coaxial with the shaft portion 115, thereby defining the axis of rotation of the shift drum 86. The shift drum 86 includes a guiding member in the form of an eccentric knob 128 offset relative to the axis of rotation of the shift drum 86. The eccentric knob 128 is fixed to the shift drum 86 and rotates with the shift drum 86 when the latter is rotated via its toothed wheel gear 94. As illustrated in FIGS. 8 and 9, the park locking lever 125 includes a body 134 having an elongated aperture 130 that fits onto the eccentric knob 128, is operatively connected thereto and acts as a follower member. A toothed segment 132 is provided on the outer edge of the body 134 which is aligned with the teeth of the idle gear 79. In operation, when the shift drum 86 is rotated to the park position, the eccentric knob 128 rotates with the shift drum 86 which in turn imparts a motion to the body 134 of the park locking lever 125 such that toothed segment 132 engages the teeth of the idle gear 79 to lock idle gear 79 to thereby prevent any further rotation of the idle gear 79. However, the elongated aperture 130 is designed to provide extended room for the eccentric knob 128 to rotate within the elongated aperture 130 while imparting little movement to the park locking lever 125 such that the toothed segment 132 remains disengaged from the idle gear 79 throughout the rotation of the shift drum 86 along the reverse, neutral, high, and low positions. The eccentric knob 128 defines a pattern about the first axis of rotation for the park locking lever 125 to follow. The eccentric knob 128 moves the park locking lever 125 towards the idle gear 79 in the final segment of rotation of the shift drum 86 between the reverse position and the park position. The toothed segment 132 of the park locking lever 125 is disengaged from the idle gear 79 when the shift drum 86 is rotated away from the park position. The park locking lever 125 is coupled to the eccentric knob 128 and follows the motion of the eccentric knob 128 through the entire path of the eccentric knob 128. The park locking lever 125 is therefore guided by the shift drum 86 as the latter rotates.

In a particular embodiment, the park locking lever 125 may be provided with a pin or knob which is inserted into a groove located on the shift drum 86 designed to guide the park locking lever 125 such that its toothed segment 132 will engage the idle gear 79 only in the park position.

Figure 10:
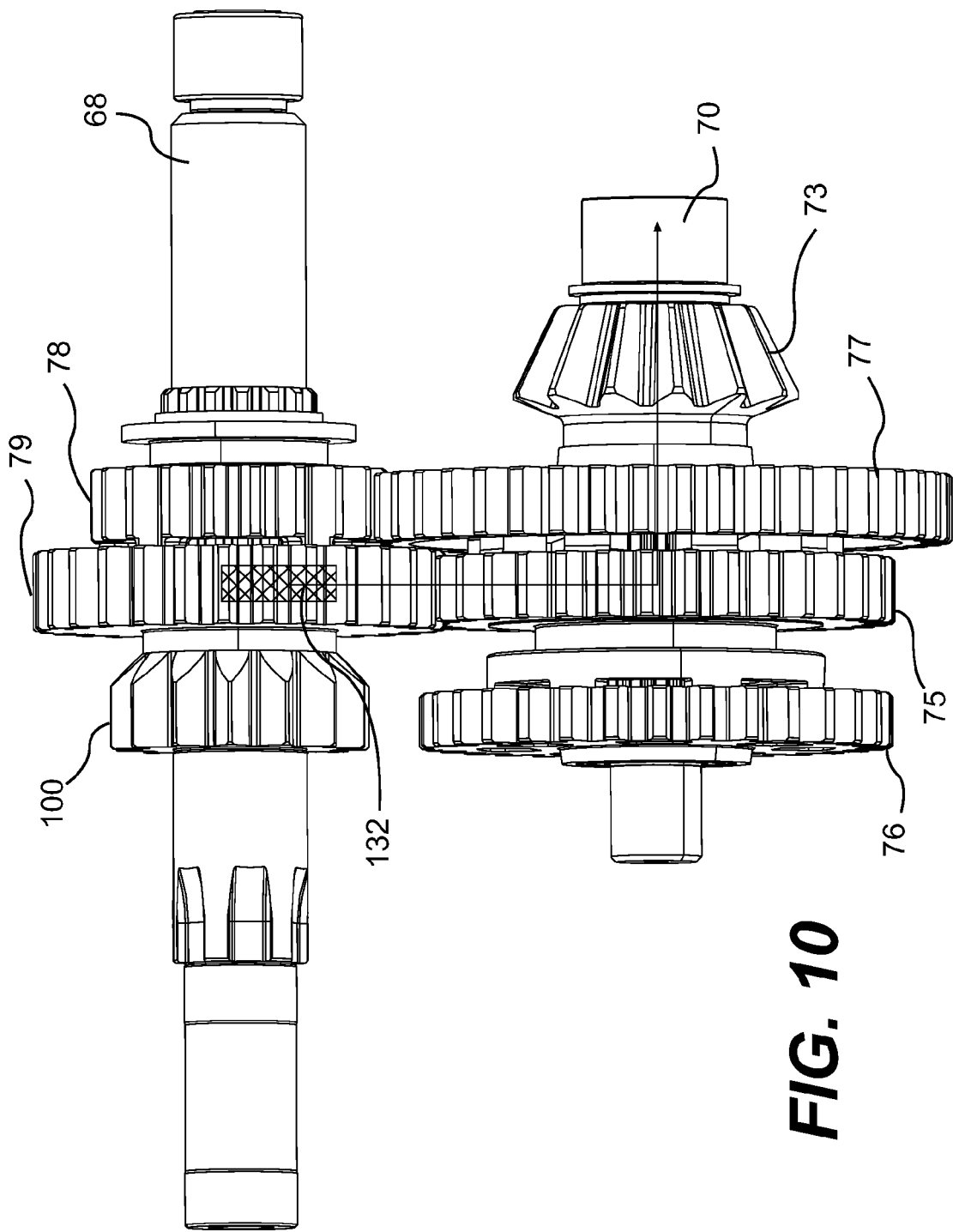
FIG. 10 is a top plan view of the gear arrangement of the transmission when in the park position.

As illustrated in FIG. 10, with the idle gear 79 locked by the toothed segment 132 of the park locking lever 125, the shift gear 75 (which is coupled to the output shaft 70 through axially aligned splines) is also immobilized. The output shaft 70 and the driving shafts 40, 42 (connected through the bevel gear 73) are thus locked.

Referring back to FIG. 4, the shifting assembly 91 is operatively connected to the shift drum 86 through the segment gear 93 engaging the toothed wheel gear 94 of the shift drum 86. Therefore rotation of the segment gear 93 is translated into a corresponding rotation of the shift drum 86. This in turn actuates the shift forks 80 and 82 to change the coupling of the gears on the input and output shafts 68 and 70. The shifting assembly 91 is positioned within the transmission housing 39 with the exception of the splined end 95 of the shifting shaft 92 which protrudes outside the transmission housing 39. The shifting assembly 91 is therefore protected from the environment.

Figure 11:
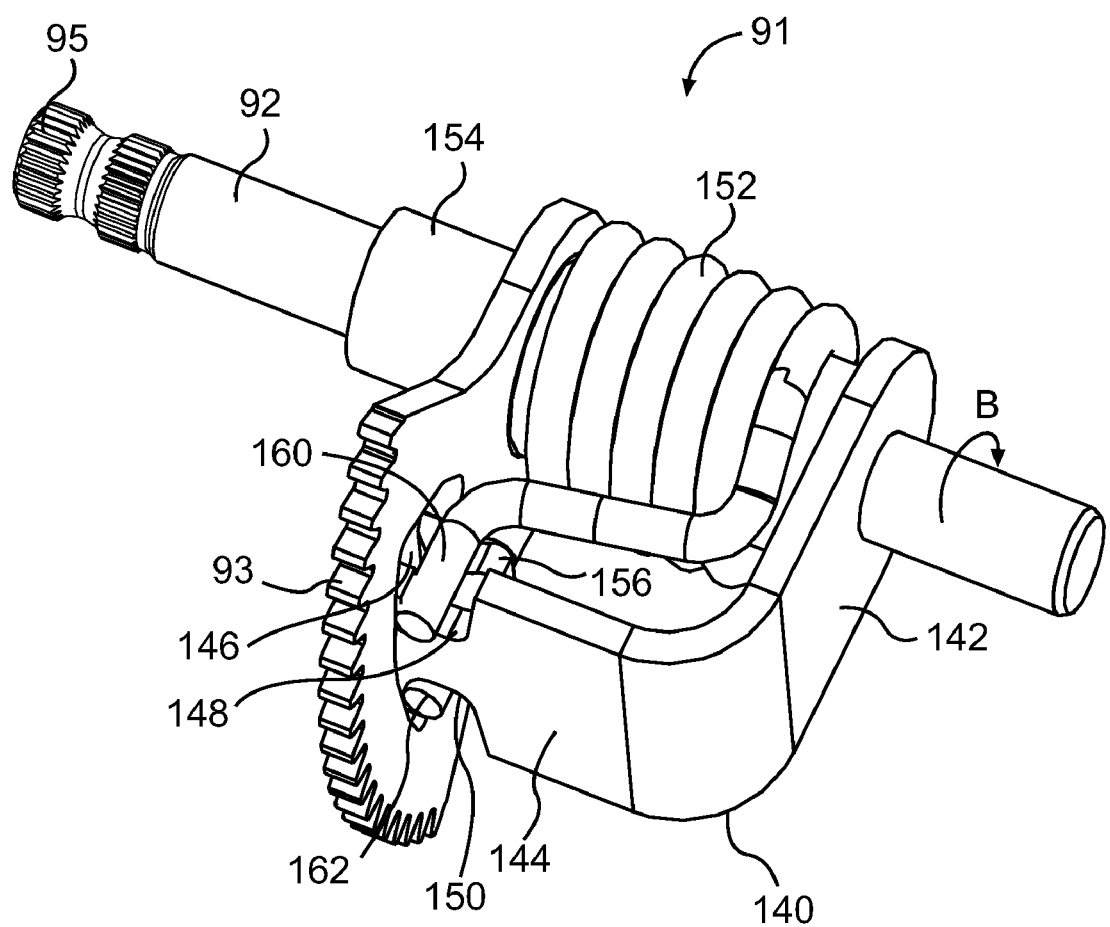
FIG. 11 is a perspective view of a selected internal component of the transmission illustrated in FIG. 4.
Figure 12:
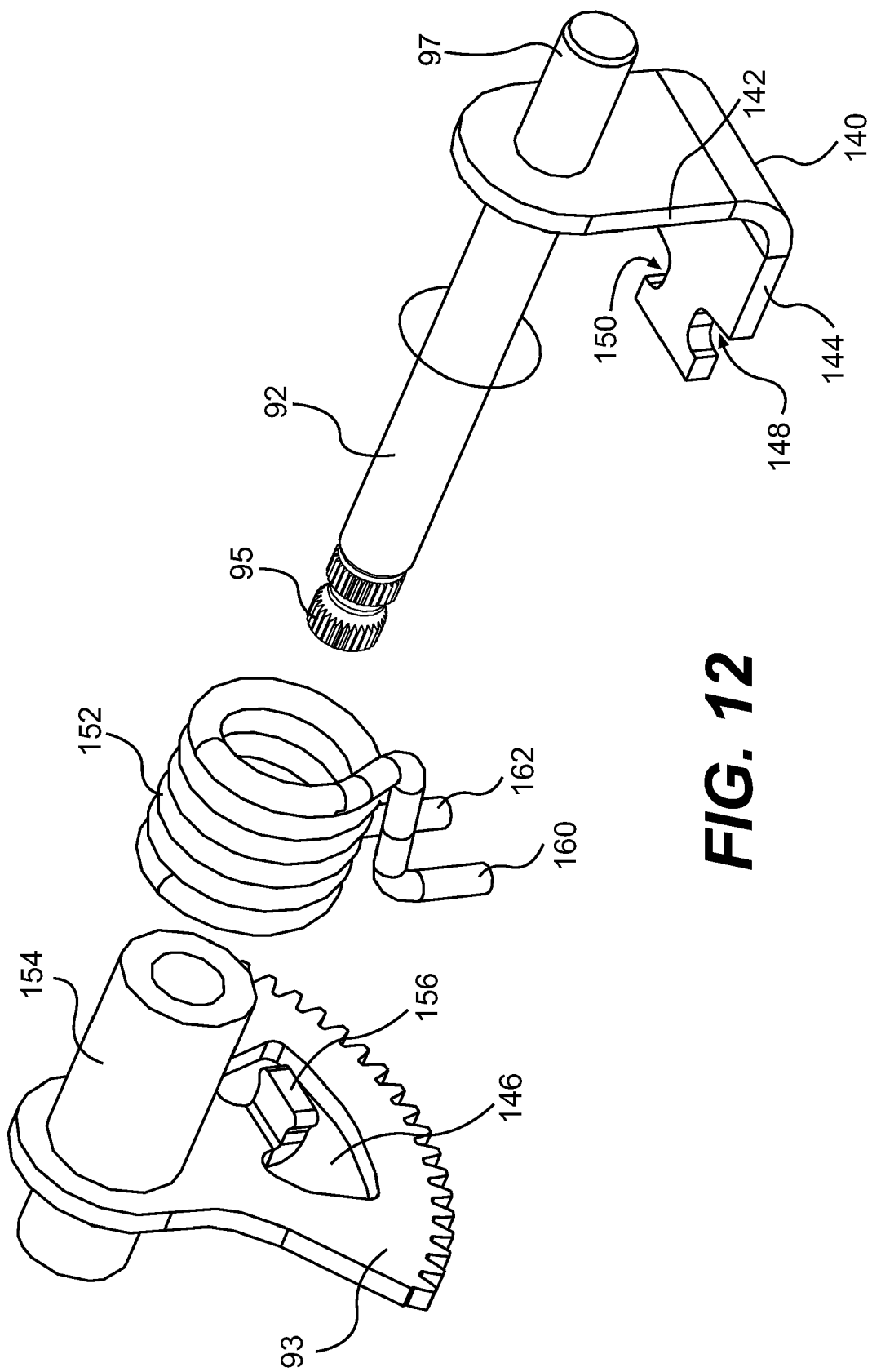
FIG. 12 is an exploded perspective view of the selected internal component illustrated in FIG. 11.

As illustrated in FIG. 11, the shifting assembly 91 includes a lever 140 fixedly connected to the shifting shaft 92 that rotates in unison therewith. The lever 140 has a first portion 142 extending perpendicular to the shifting shaft 92 and a second portion 144 extending parallel to the shifting shaft 92. The shifting assembly 91 also includes a torsion spring 152 installed onto a sleeve portion 154 of the segment gear 93. With reference to FIG. 12, the torsion spring 152 is a coil spring wherein the extremities are bent to extend perpendicular to the coil within a single plane. The inside diameter of the torsion spring 152 corresponds approximately to the outside diameter of the sleeve portion 154 of the segment gear 93. The segment gear 93 is fixedly connected to the sleeve portion 154 which has an inside diameter corresponding to the outside diameter of the shifting shaft 92. The sleeve portion 154 including the segment gear 93 are rotatably mounted onto the shifting shaft 92. The segment gear 93 further includes a seat 156 projecting from one edge of an opening 146 in the central portion of the segment gear 93 and extending parallel to sleeve portion 154. The end of the second portion 144 of the lever 140 includes a pair of recesses 148 and 150 adapted to receive the extremities 160 and 162 of the torsion spring 152.

Referring back to FIG. 11, the sleeve portion 154 of the segment gear 93 is inserted into the torsion spring 152. The shifting shaft 92 is inserted into the sleeve portion 154 of the segment gear 93 such that the second portion 144 of the lever 140 extends towards the segment gear 93. The projecting seat 156 of the segment gear 93 extends towards the lever 140 as illustrated. The recesses 148 and 150 are aligned with the sides of the projecting seat 156. The extremities 160 and 162 of the torsion spring 152 abut against both the recesses 148 and 150 and the projecting seat 156. The rotational movement of the shifting shaft 92 imparted by the gear selector 99 connected to the splined end 95 is thus transferred to the segment gear 93 through the torsion spring 152.

In operation, when the operator of the vehicle is selecting a gear position, the shifting shaft 92 is rotated clockwise or counter clockwise. In the event the shifting shaft 92 is rotated clockwise as indicated by the arrow B, the lever 140 rotates and pushes on the extremity 160 of the torsion spring 152 positioned within the recess 148. The torsion spring 152 transfers the pushing force to its other extremity 162 which abuts against the side of the projecting seat 156. This imparts rotational motion to the segment gear 93 which in turn rotates the shift drum 86 to effect gear selection. Similarly, in the event the shifting shaft 92 is rotated counter clockwise (in the opposite direction to the one indicated by the arrow B), the lever 140 rotates and pushes on the extremity 162 of the torsion spring 152 positioned within the recess 150. The torsion spring 152 transfers the pushing force to its other extremity 160 which abuts against the side of the projecting seat 156. This imparts rotational motion to the segment gear 93 which in turn rotates the shift drum 86 in the other direction to effect gear selection.

In the operation of the vehicle 10, it is possible that the shift gears 75 or 78 may be difficult to engage to or disengage from their adjacent gears should for instance the engaging members of adjacent gears be misaligned or should the friction forces between two coupled gears be such that the force required to the shift gears 75 or 78 places undue stress on the shift forks 82, 84. The shifting assembly 91 is provided to alleviate some of these locking problems. If a gear change is difficult to effect, when the operator applies a force to the gear selector 99 connected to the splined end 95 of the shifting shaft 92 thereby applying a torque to the shifting shaft 92, the lever 140 will push on the corresponding extremity 160 or 162 of the torsion spring 152. However the other extremity 160 or 162 of the torsion spring 152 will only apply a limited force to the seat 156 while a portion of the applied force or torque will be stored in the spring 152 itself through the prying apart the two extremities 160 or 162 (proportional to the spring rate or spring constant k of the torsion spring 152). The excess force or energy received through the gear selector 99 is therefore stored temporarily in the shifting assembly 91 and more specifically in the torsion spring 152 to protect the internal components of the transmission from excessive force. This energy is released through the internal components of the transmission if the situation that made the gear change difficult to effect is eliminated or back to the gear selector 99 through the shifting shaft 92 if the situation remains unchanged.

Similarly, the gear selector 99 connected to the splined end 95 of the shifting shaft 92 may be guided through a channel provided with gates or recesses corresponding to the various positions i.e. park, reverse, neutral, high, and low. The gear selector 99 may be locked into the gates or recesses to prevent unwanted gear changes. A situation may arise where the gear selector 99 may be moved into a gate or recess and locked into that position while the shift gears 75 or 78 are not yet engaged because of misalignment or excessive friction two coupled gears. In this instance, the shifting assembly 91 absorbs the differential displacement of the shift drum 86 relative to the locked position of the gear selector 99 through the torsion spring 152. The energy stored in the shifting assembly 91 will be released to effect the corresponding gear change if and when the situation which made the gear change difficult to effect is eliminated.

Figure 13:
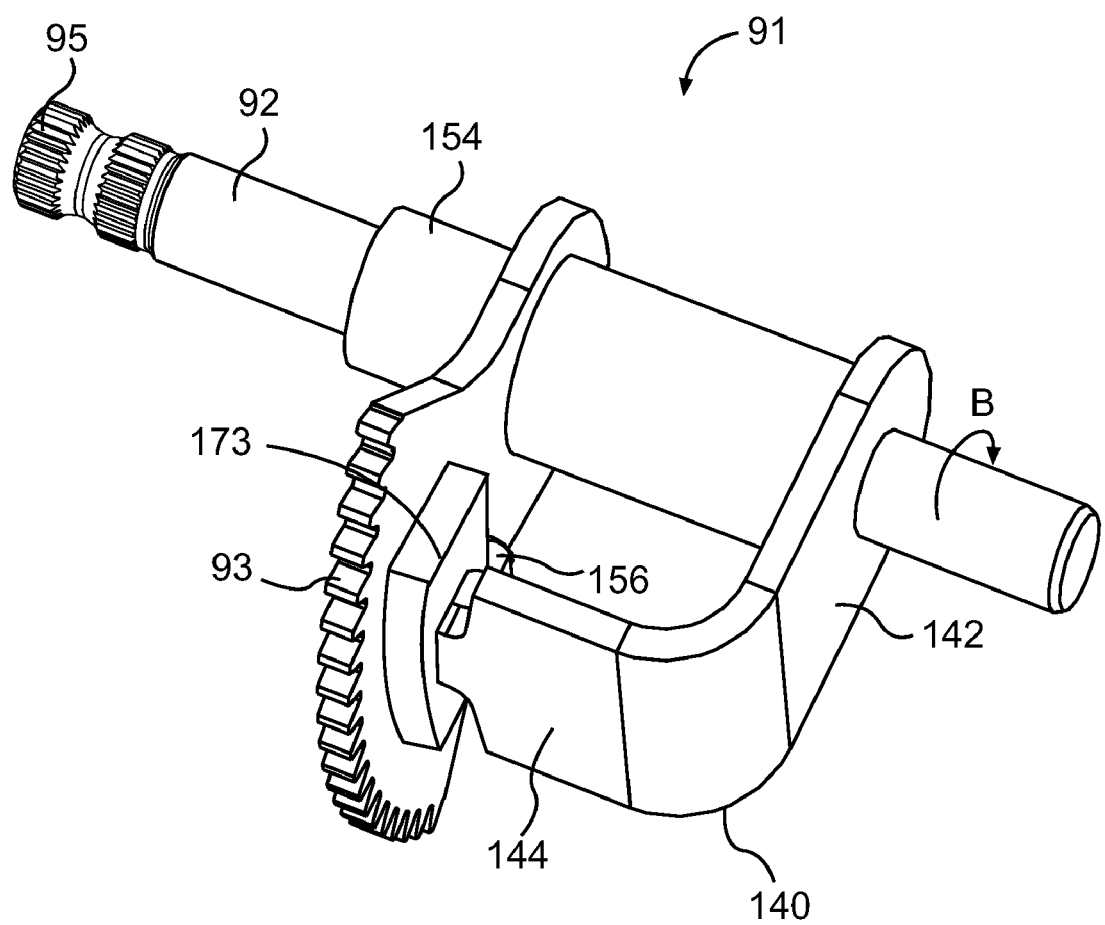
FIG. 13 is a perspective view of a selected internal component of the transmission in accordance with another embodiment of the invention.

As illustrated in FIG. 13, in another embodiment, the lever 140 may be connected to the segment gear 93 via an elastomer or rubber element 173 that can be deformed under a load and return to its initial shape once the load is removed thereby providing the energy storing capability to the shifting mechanism 91. In this particular embodiment, the elastomer or rubber element 173 is inserted onto the opening of the segment gear 93 and the second portion 144 of the lever 140 to the segment gear 93 is inserted into the elastomer or rubber element 173. In operation, when the operator of the vehicle is selecting a gear position, the shifting shaft 92 is rotated clockwise or counter clockwise. In the event the shifting shaft 92 is rotated clockwise as indicated by the arrow B, the lever 140 rotates and pushes on the elastic element 173 positioned within the recess of the segment gear 93. The elastic element 173 transfers the pushing force directly onto segment gear 93 which in turn rotates the shift drum 86 to effect gear selection. In this instance, the shifting assembly 91 absorbs the differential displacement of the shift drum 86 relative to the locked position of the gear selector 99 through the elastic element 173. In general, any deformable elastic component could be used to connect the lever 140 to the segment gear 93 without departing from the scope of the invention.

In a further embodiment (not shown), the function of the elastic element 173 may be replaced by two separate spring elements disposed on opposite sides of the lever 140, each spring mounted on the segment gear 93 so as to bias the lever 140 in a center position and adapted to absorb the differential displacement of the shift drum 86 relative to the locked position of the gear selector 99.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A transmission assembly comprising:
a housing;
a gear selector disposed outside the transmission housing;
an input shaft and an output shaft, both shafts being at least partially inside the housing;
a plurality of gears mounted on the input shaft and a plurality of gears mounted on the output shaft, each of the plurality of gears being disposed within the housing;
a gearshift disposed within the housing and operatively connected to at least one of the plurality of gears mounted on the input shaft and to at least one of the plurality of gears mounted on the output shaft for effecting gear changes; and
an energy storing mechanism including a deformable elastic element for storing energy through its deformation, the energy storing mechanism being disposed within the housing and linking the gear selector to the gearshift and limiting a force applied to the gearshift through the gear selector, the deformable elastic element being positioned such that a movement of the gear selector is transferred from the gear selector to the gearshift through the deformable elastic element.

2. A transmission assembly as defined in claim 1 wherein the elastic element is selected from the group consisting of metal springs, elastomer elements and rubber elements.

3. A transmission assembly as defined in claim 2 wherein the energy storing mechanism further includes a first element connected to the gear selector and a second element connected to the gearshift, the elastic element connecting the first element to the second element.

4. A transmission assembly as defined in claim 3 wherein the first element is a lever and the second element is an actuator operatively connected to the gearshift.

5. A transmission assembly as defined in claim 4 wherein the actuator includes a series of teeth adapted to engage a gearing on the gearshift.

6. A transmission assembly as defined in claim 4 wherein the actuator includes a seat for securing the elastic element.

7. A transmission assembly as defined in claim 4 wherein the gear selector is connected to a shifting shaft protruding outside the housing and the lever is fixedly connected to the shifting shaft.

8. A transmission assembly as defined in claim 7 wherein the lever has a first portion and a second portion, the first portion extending outwardly from the shifting shaft and the second portion extending towards the second element; the second portion adapted to secure the elastic element.

9. A transmission assembly as defined in claim 7 wherein the actuator is rotatably connected to the shifting shaft and the elastic element operatively connects the lever to the actuator.

10. A transmission assembly as defined in claim 9 wherein the actuator includes a sleeve portion and the shifting shaft is mounted into the sleeve portion to provide rotatable connection between the actuator and the shaft.

11. A transmission assembly as defined in claim 7 wherein the elastic element is mounted to the shifting shaft.

12. A transmission assembly as defined in claim 1 wherein the energy storing mechanism is disposed parallel to the gearshift.

13. An all-terrain vehicle comprising:
a frame supporting front and rear wheels;
a straddle seat supported above the frame;
a steering device member forward of the straddle seat;
an engine having an output shaft, the engine being supported by the frame;

a transmission as defined in claim 1 operatively interconnected between the output shaft of the engine and at least one of the wheels.

14. A transmission assembly comprising:

a housing;

a gear selector disposed outside the transmission housing;

an input shaft and an output shaft, both shafts being at least partially inside the housing;

a plurality of gears mounted on the input shaft and a plurality of gears mounted on the output shaft, each of the plurality of gears being disposed within the housing;

a gear shifting mechanism disposed within the housing and operatively connected to at least one of the plurality of gears and to the gear selector for effecting gear changes; and an energy storing mechanism including a deformable elastic element for storing energy through its deformation, the energy storing mechanism linking the gear selector to the gear shifting mechanism and limiting a force applied to the gear shifting mechanism through the gear selector, the energy storing mechanism being disposed within the transmission housing, the deformable elastic element being positioned such that a movement of the gear selector is transferred from the gear selector to the gearshift through the deformable elastic element.

15. A transmission assembly as defined in claim 14 wherein the elastic element is selected from the group consisting of metal springs, elastomer elements and rubber elements.

16. A transmission assembly as defined in claim 14 wherein the energy storing mechanism further includes a first element connected to the gear selector and a second element connected to the gear shifting mechanism, the elastic element connecting the first element to the second element.

17. A transmission assembly as defined in claim 16 wherein the first element is a lever and the second element is an actuator operatively connected to the gear shifting mechanism.

18. A transmission assembly as defined in claim 17 wherein the gear selector is connected to a shaft protruding outside the housing, the lever being fixedly connected to the shaft.

19. A transmission assembly as defined in claim 18 wherein the actuator is rotatably connected to the shaft, the elastic element operatively connecting the lever to the actuator.

20. A transmission assembly as defined in claim 14 wherein the energy storing mechanism is disposed parallel to the gear shifting mechanism.

\* \* \* \* \*